United States Patent
Canton et al.

(10) Patent No.: US 10,860,791 B2
(45) Date of Patent: *Dec. 8, 2020

(54) IDENTIFICATION OF SETS AND MANIPULATION OF SET DATA IN PRODUCTIVITY APPLICATIONS

(71) Applicant: Microsoft Technology Licensing, LLC, Redmond, WA (US)

(72) Inventors: Christian Canton, Bellevue, WA (US); Christopher Gross, Seattle, WA (US); Joseph McDaid, Seattle, WA (US); Johnny Campbell, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/548,018

(22) Filed: Aug. 22, 2019

(65) Prior Publication Data

US 2019/0377787 A1  Dec. 12, 2019

Related U.S. Application Data

(63) Continuation of application No. 15/893,310, filed on Feb. 9, 2018, now Pat. No. 10,445,422.

(51) Int. Cl.
*G06F 17/00* (2019.01)
*G06F 40/18* (2020.01)

(52) U.S. Cl.
CPC .................. *G06F 40/18* (2020.01)

(58) Field of Classification Search
CPC ...................................................... G06F 40/18
See application file for complete search history.

(56) References Cited

U.S. PATENT DOCUMENTS

| | | | |
|---|---|---|---|
| 2014/0278755 A1* | 9/2014 | Eberl | G06F 16/244 705/7.29 |
| 2014/0280191 A1* | 9/2014 | Cronin | G06F 3/04842 707/741 |
| 2015/0261729 A1* | 9/2015 | Davis | G06F 40/111 715/234 |
| 2016/0306862 A1* | 10/2016 | Sitsky | G06F 16/254 |
| 2017/0344745 A1* | 11/2017 | Wadley | H04L 63/10 |
| 2018/0164972 A1* | 6/2018 | Latzina | G06F 3/0486 |

* cited by examiner

*Primary Examiner* — Laurie A Ries

(57) ABSTRACT

In non-limiting examples of the present disclosure, systems, methods and devices for interacting with data in a productivity application are presented. A plurality of values associated with the productivity application may be analyzed to determine whether they include a value that can be added to a set comprising a plurality of values with a set data type upon which the productivity application can execute a plurality of set operations. An indication to add at least one of the analyzed values as a member of the set may be received. At least one of the analyzed values may be added as a member of the set. An indication to perform a set operation associated with the set may be received and performed, and the result of the performed set operation may be displayed on a productivity application user interface.

20 Claims, 10 Drawing Sheets

FIG. 2

*Spreadsheet Application*

| File | Home | Insert | Design | Layout | Formulas | Data | Review | View | |
|---|---|---|---|---|---|---|---|---|---|

Calibri ∨ 8 pt. ∨  A⁴ A⁻ Aa⁻ abc A⁻
B I U abc X₂ X²  A⁻ ✎⁻ A

| Clipboard | Font | Paragraph | Styles | Cell Styles | Operator Type | $ % , |

204 →  [Only Unique Combinations / Unique Combinations with... / Unique Combinations without...]

| | A | B | C | D | E | F | G | H | I | J | K | L |
|---|---|---|---|---|---|---|---|---|---|---|---|---|
| 1 | Last Name | Question 1 | Question 2 | Question 3 | | | | | | | | |
| 2 | Montoya | TRUE | D | ≣Toyota; H... | | | | | | | | |
| 3 | Holcomb | FALSE | D | ≣Toyota; A... | | | | | | | | |
| 4 | Schmidt | FALSE | A | ≣Toyota; H... | | | | | | | | |
| 5 | Nicholson | TRUE | B | ≣Chevrolet... | | | | | | | | |
| 6 | Jacobson | FALSE | C | ≣Audi; BM... | | | | | | | | |
| 7 | Randolph | FALSE | A | ≣Acura; A... | | | | | | | | |
| 8 | Vance | TRUE | B | ≣Chevy; B... | | | | | | | | |
| 9 | Fowler | TRUE | B | ≣Toyota; H... | | | | | | | | |

Sort A to Z
Sort Z to A
Filter by Combinations
☐ (Select All)
☐ Acura
☐ Aston Martin
☐ Audi
☐ BMW
☐ Chevrolet
☐ Chrysler
☐ Dodge
☐ Ford
☐ Honda
☐ Lexus
☐ Mercedes
☐ Toyota

[ OK ]  [ Cancel ]

Sheet 1       + 104%

200, 202, 206

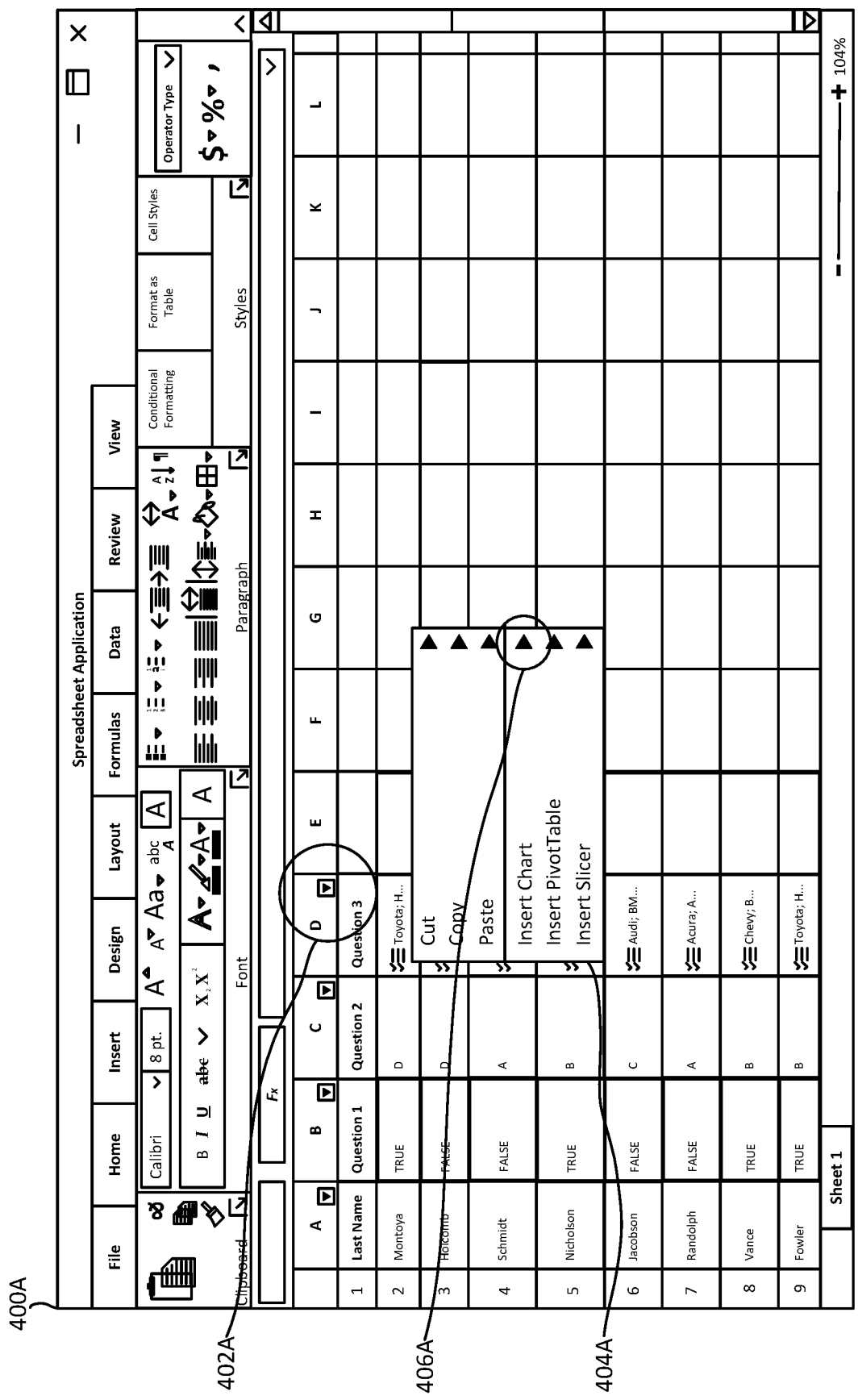

IDENTIFICATION OF SETS AND MANIPULATION OF SET DATA IN PRODUCTIVITY APPLICATIONS

RELATED APPLICATIONS

This application is a continuation of U.S. patent application Ser. No. 15/893,310, entitled "IDENTIFICATION OF SETS AND MANIPULATION OF SET DATA IN PRODUCTIVITY APPLICATIONS," filed Feb. 9, 2018, which is hereby incorporated by reference in its entirety.

BACKGROUND

Businesses and individual users of spreadsheet applications and other computer-implemented productivity applications utilize those applications to store and organize a wide variety of data. It is common for a single sheet in an application instance to include hundreds, if not thousands, of data entries spread amongst columns and rows therein. The large amount of data that is included in these application instances often makes traversing that data, understanding that data, and determining useful relationships for performing analysis of that data, difficult and time consuming for users. This is especially true in the case of sets of non-numeric data or text, which may include strings of data that constitute lists within lists, thereby compounding the user experience and data analysis issues described above.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for interacting with data in a productivity application. In specific examples, systems, methods and devices are provided for analyzing values associated with a productivity application instance, and receiving an indication to convert one or more analyzed values to members of a set. According to examples, a set may comprise a plurality of values of a set data type. In some examples, each value of a set (i.e., set member) may have one or more properties associated with it. According to additional examples, the identity of each set member and/or properties associated with each set member, may be included in an index accessible by the productivity application. In other examples, the identity of each set member and/or the properties associated with each set member may be associated with each set member, as metadata, in an executing application instance.

Upon converting one or more values included in a productivity application instance to set members, an indication to perform a set operation associated with at least one of the converted values may be received. As part of execution of the set operation, one or more of the following set calculations may be performed: a subtraction calculation to subtract of one or more set members from one or more other members of the set; an add calculation to add one or more set members to one or more other members of the set; a divide calculation to divide one or more set members by one or more other members of the set; and a multiply calculation to multiply one or more set members with one or more other members of the set. In some examples, one or more of these calculations may be performed on subsets of a set according to properties that one or more set members share with one another. In this manner, set members may be sorted and filtered according to their various properties, and simple user interface elements (e.g., sorted lists, filtered lists, graphs) displaying the result of such operations may be provided to productivity application users.

BRIEF DESCRIPTION OF THE DRAWINGS

Non-limiting and non-exhaustive examples are described with reference to the following figures:

FIG. 2 illustrates an exemplary spreadsheet application user interface that includes a pop-up window for receiving an indication to modify a display of members of a set based on selectable filtering and/or selectable sorting operations.

FIG. 4A illustrates an exemplary spreadsheet application user interface that includes a pop-up window for receiving an indication to insert a chart or table corresponding to one or more operations that may be performed in association with values of a set.

DETAILED DESCRIPTION

Figure 1:
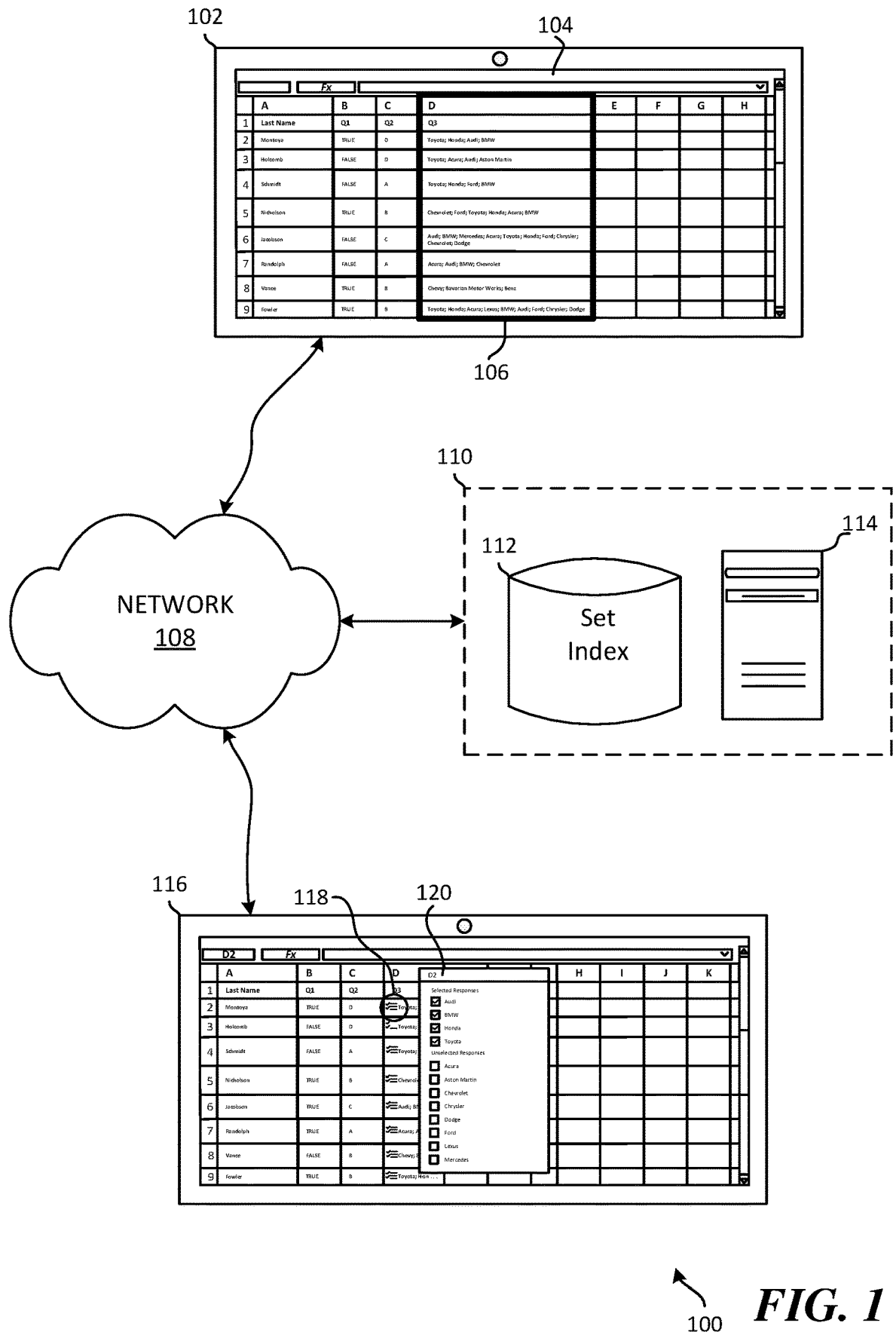
FIG. 1 is a schematic diagram illustrating an example distributed computing environment for interacting with set data in a productivity application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for interacting with set data in productivity applications. According to examples, data in a productivity application may be arranged in a grid-type format. For example, one or more values may be arranged in columns and rows of the productivity application. According to examples, the productivity application and/or a productivity service associated with the productivity application may analyze values in, or associated with, the application instance, and a determination may be made that one or more values belong or may belong to a set comprising a plurality of values with a set data type upon which the productivity application and/or the productivity service may execute a plurality of set operations. In some examples, the determination may comprise reviewing an index comprising a plurality of sets and a plurality of set members, and determining whether each analyzed value in the application instance matches a set value corresponding to a set member. In additional examples, the determination may comprise determining that one or more values in a cell of a column and/or row of an application instance is repeated in one or more other cells of a same column and/or row. In some examples, in making such a determination, an additional determination may be made that one or more cells in a column and/or row contain a string of values of a same value type. In other examples, in making such a determination, a determination may be made that one or more cells in a column and/or row contain values separated by a string delimiter, such as a semicolon or a comma, although other string delimiters are contemplated.

In some examples, a set index in which the identity of members of one or more sets, and/or information associated with members of one or more sets is stored, may comprise a plurality of synonyms and/or similarly spelled words or phrases corresponding to one or more set members, and the determination that one or more values of an application instance belong or may belong to a set may comprise reviewing an index comprising a plurality of sets and a plurality of set members, and determining whether each analyzed value in the application instance matches a set value corresponding to a set member and/or a synonym and/or similarly spelled word or phrase corresponding to one or more set members. In other examples, a user command may be received by a computing device executing a productivity application instance that one or more values in an application instance should be added to and/or associated with, a set. For example, a user may provide a typed command, verbal command, and/or command via interaction with a user interface element, that one or more values comprised in one or more cells of an application instance, and/or one or more values associated with an object of an application instance, belong to an existing set and/or that one or more values comprised in one or more cells of an application instance, and/or one or more values associated with an object of an application instance, should be associated with a new set.

In some examples, upon determining that one or more values included in, or associated with, a productivity application instance belong to or may belong to a set, the one or more values may be automatically converted to a set data type and/or associated with a set via a set index. In additional examples, upon determining that one or more values included in, or associated with, a productivity application instance belong to or may belong to a set, a prompt and/or selectable user interface element may be presented in the application instance, which if selected, may execute a conversion operation to convert the one or more values to a set data type and/or associate the one or more values with a set via a set index.

In some examples, the values of a set (i.e., set members) may exist entirely in a productivity application instance (e.g., in one or more sheets of a spreadsheet instance, in one or more pages of a word processing document instance). In other examples, one or more values of a set may exist in a productivity application instance, and one or more values of the set may exist in an index associated with the productivity application. In some examples, additional information related to set values may be comprised in an index associated with a set. Thus, a set index may comprise the identity of each value in a set, the identity of subsets with unique properties associated with each subset, and/or one or more properties associated with each set value. In other examples, this information may be stored in a spreadsheet application or a spreadsheet application file. In one example, this information may be stored as metadata associated with a set value in a productivity application instance/file that includes a set value. Properties that may be associated with set members may comprise one or more of: a set member type, the identification of a subset that a set member belongs to, the identification of a set that a set member belongs to, and/or values associated with a set member (e.g., physical property values, rank values, monetary values, sales values, popularity values, etc.).

In a specific example, if values of a set comprise values "apple", "orange", "lettuce" and "asparagus", a set index including the identity of each value in the set, as well as other information associated with members of the set may be stored with a productivity application on a client computing device executing a productivity application instance that includes those values and/or on one or more remote computing devices. In this example, additional information contained in the index may indicate that the "apple" set member has the following properties: fruit, and red or green color. Additional information contained in the index may indicate that the "orange" set member has the following properties: fruit, orange color. Additional information contained in the index may indicate that the "lettuce" set member has the following properties: vegetable, green color. Additional information contained in the index may indicate that the "asparagus" set member has the following properties: vegetable, green color. The index may also comprise the identity of other members of the set (e.g., other fruits in the set, other vegetables in the set).

Upon converting and/or associating one or more values included in, or associated with, a productivity application instance to set members, one or more set operations associated with the set may become executable by the productivity application, and the results of an executed set operation may be provided to a user via one or more user interface elements of a client computing device executing and/or displaying the productivity application instance. In some examples, executable set operations may comprise operations that relate to properties associated with set members, the identity of set members, and/or the relationship of subsets of set members in relation to other set members. The executable set operations may involve one or more computations that involve set-theory calculations associated with one or more members of a set. For example, the computations may comprise one or more of: add operations associated with members of a set, subtract operations associated with members of a set, divide operations associated with members of a set, and multiply operations associated with members of a set. One or more of these operations may be applied to various features supported by a productivity application in the implementation of set-based operations performed on sets as described herein. According to some examples, set operations that may be executable on set members may comprise one or more of: sort operations, filter operations, chart operations, and/or other set analytics operations associated with a set.

The productivity applications/services described herein may comprise but are not limited to: spreadsheet applications/services, word processing applications/services, note taking applications/services, authoring applications/services, digital presentation applications/services, search engine applications/services, email applications/services, messaging applications/services, web browsing applications/services, collaborative team applications/services, directory applications/services, mapping applications/services, calendaring applications/services, and social networking applications/services, among others. In some examples, an exemplary productivity application/service may be a component of a suite of productivity applications/services that may be configured to interface with other applications/services associated with a platform. Further, an exemplary productivity application/service may be configured to interface with other internet sources/services, including third-party applications/services, for example, to enhance functionality and/or use of the productivity application. In some examples, the productivity application described herein may be executed entirely on a personal computing device storing the productivity application. In other examples, the productivity application may be accessed by a personal computing device in association with one or more remote computing devices that assist with execution and/or display of an instance of the productivity application on an accessing personal computing device. For example, the productivity application, or data associated with the productivity application, may comprise a cloud-based application that is executed in whole or in part on one or more remote computing devices.

FIG. 1 is a schematic diagram illustrating an example distributed computing environment 100 for interacting with set data in a productivity application. Exemplary distributed computing environment 100 includes computing device 102 and computing device 116, which may be the same or different computing devices from which a productivity application is accessed, as well as network 108, and set index and processing environment 110.

Computing device 102 comprises a display of a productivity application instance that is being executed. In some examples, the productivity application instance may be executed solely by computing device 102. In other examples, the productivity application instance may be executed in association with one or more remote computing devices, such as server computing device 114 in set index and processing environment 110. Computing device 102 displays, on productivity application user interface 104, the results of a survey. The results include responses from a plurality of survey takers that have provided answers to three questions, with values corresponding to answers to question three reflected in column D 106. The values in column D 106 reflect car manufacturer names that were included in response to question three by individual survey takers identified in column A. As depicted therein, each survey taker's response to question three includes a string of car manufacturer names separated from one another by a semicolon delimiter. Specifically, the string in column D 106 corresponding to survey taker Montoya comprises Toyota; Honda, Audi; BMW. The string in column D 106 corresponding to survey taker Holcomb comprises Toyota; Acura; Audi; Aston Martin. The string in column D 106 corresponding to survey taker Schmidt comprises Toyota; Honda; Ford; BMW. The string in column D 106 corresponding to survey taker Nicholson comprises Chevrolet; Ford; Toyota; Honda; Acura; BMW. The string in column D 106 corresponding to survey taker Jacobson comprises Audi; BMW; Mercedes; Acura; Toyota; Honda; Ford; Chrysler; Chevrolet; Dodge. The string in column D 106 corresponding to survey taker Randolph comprises Acura; Audi; BMW; Chevrolet. The string in column D 106 corresponding to survey taker Vance comprises Chevy; Bavarian Motor Works; Benz. The string in column D 106 corresponding to survey taker Fowler comprises Toyota; Honda; Acura; Lexus; BMW; Audi; Ford; Chrysler; Dodge.

According to examples, one or more computing devices associated with the execution of the productivity application instance depicted on computing device 102 may analyze a plurality of values included in the application instance. The analysis may comprise identifying one or more strings included in the application instance, including identifying a plurality of values in one or more cells separated by a delimiter. In some examples, the analysis may comprise determining whether one or more values included in the productivity application instance may correspond to set members of an existing set. For example, a set index, such as set index 112, may be compared against one or more values included in the productivity application. In some examples, each value from a productivity application instance that is compared against a set index, may be compared for determining whether the identity of each value (e.g., the spelling of a word or term, a numerical value, etc.) matches an identity of a set member of an existing set in the set index. In additional examples, each value from a productivity application instance that is compared against a set index may be compared for determining whether the identity of each value matches a synonym for a set member of an existing set in the set index.

The set index may comprise one or more sets, the identity of one or more set members, and one or more properties associated with each set member of each set. In the illustrated example, set index 112 is comprised within set index and processing environment 110, and set index 112 may be stored on one or more computing devices associated with execution of the productivity application instance, such as server computing device 114. In such examples, computing device 102 may communicate with set index 112 and server computing device 114 via network 108. In other examples, a set index may be comprised in association with the productivity application service on computing device 102.

Based on the analysis of the plurality of values included in the productivity application, a determination may be made as to whether one or more of those values may correspond to set members of an existing set. In some examples, if a determination is made that one or more of those values corresponds to set members of an existing set, a computing device assisting with execution of the spreadsheet application instance (e.g., computing device 102, server computing device 114) may automatically convert each corresponding value to a set member of the set. In other examples, if a determination is made that one or more of those values corresponds to set members of an existing set, a computing device assisting with execution of the spreadsheet application may provide a selectable user interface element, which if selected, converts each corresponding value to a set member of the set. In still other examples, if a determination is made that no existing set exists which members of a string correspond to, an executable option may be made available to a user for creating a new set comprised of a plurality of identified string members. For example, an executable option may be made available for creating a new set comprised of each string value included in a column or row identified in a spreadsheet application instance. In additional examples, if a productivity application element (e.g., a cell) comprises a plurality of strings, one or more values in each string of that element may be automatically converted to a member of a set, and/or an executable option may be provided for converting one or more values included in those one or more strings to a member of a set or subset.

In the illustrated example, a determination has been made that each string value included in column D 106 of the productivity application instance corresponds to a set member. As such, each of the values in column D 106 has been converted to a set member. In some examples, a user may be prompted to name the set, or if the set is an existing set (e.g., the set already exists in a set index), a name of the set may automatically be associated with the values of the spreadsheet application that are to be converted to set members. For example, the values that are to be converted to set members in the illustrated example may automatically be associated with the set name "car manufacturers".

Upon determining that each string value included in Column D 106 of the productivity application instance corresponds to a set member, each of those values may be converted to as corresponding set members of the set "car manufacturers". In the illustrated example, the identity of a plurality of values in column D 106 have been directly matched to identities of set members in the existing "car manufacturers" set, and other values in column D 106 have been matched to synonyms of set members in the existing "car manufacturers" set. For example, the value "BMW", found in cells D2, D4, D5, D6, D7 and D9 may have been directly matched to a "BMW" set member in the existing "car manufacturers" set, and the value "Bavarian Motor Works" in cell D8 may have been matched to a synonym of the "BMW" set member in the existing "car manufacturers" set. Likewise, the values "Chevy" and "Benz" in cell D8 may have been matched to synonyms of set members "Chevrolet" and "Mercedes", respectively, in the existing "car manufacturers" set.

In converting each string value in column D 106 to a set member of existing set "car manufacturers", user interface elements associated with each cell in column D 106 containing a string value may be modified to reflect each value belonging to the set. In additional examples, one or more user interface elements may be surfaced in association one or more converted values and/or a row or column in which the set members are included. In this example, the new user interface elements reflecting the conversion of the string values in column D 106 to set members of existing set "car manufacturers" is reflected on the display of computing device 116, which may be the same or a different computing device as computing device 102.

Computing device 116 also displays a plurality of unique user interface elements for interacting with and/or viewing information associated with the converted string values, which are now associated with existing set "car manufacturers". In this example, each cell in column D of the user interface displayed on computing device 116 comprises a user interface icon which visually indicates that each of those cells includes set members. For example, cell D2 includes user interface icon 118, which is illustrative of this type of user interface element, although other display types for indicating that cells and/or other portions of a productivity application instance include set members may be utilized according to the description provided herein. In some examples, each user interface icon that visually indicates that a cell and/or element of a productivity application instance includes a set member (e.g., user interface icon 118) may be selectable by a user for displaying and/or interacting with information associated with the set members included in that cell and/or element. In additional examples, each user interface icon that visually indicates that a cell and/or element of a productivity application instance includes a set member (e.g., user interface icon 118) may also be selectable by a user for displaying and/or interacting with information associated with the set members included in that cell and/or element, as well as displaying and/or interacting with information associated with other members of the set.

In the illustrated example, a user has selected (e.g., through a mouse click, a tactile input, etc.) user interface icon 118 relating set members of set "car manufactures" included in cell D2, and pop-up window 120 is therefore caused to be displayed in a location proximate that selection. Pop-up window 120 visually indicates user Montoya's car manufacturer responses to question three (i.e., Audi, BMW, Honda, Toyota), in addition to responses to question three by other respondents (i.e., Acura, Aston Martin, Chevrolet, Chrysler, Dodge, Ford, Lexus, Mercedes), that were not included in user Montoya's car manufacturer responses to question three.

FIG. 2 illustrates an exemplary spreadsheet application user interface 200 that includes a pop-up window 202 for receiving an indication to modify a display of members of a set based on selectable filtering and/or selectable sorting operations.

User interface elements comprising cells D2-D9 include values that have been converted to set members of a "car manufacturers" set. In this example a user has selected selectable user interface element 206, which when selected, executes a display operation by a computing device executing displayed productivity application user interface 200. The executed display operation causes pop-up window 202 to be displayed in user interface 202, which includes mechanisms for interacting with set members of set "car manufacturers" comprised in column D Pop-up window 202 provides a viewable display of the identity of each "car manufacturer" set member included in column D of spreadsheet application user interface 200, selectable user interface elements to execute filtering operations associated with "car manufacturer" set members included in column D, as well as selectable user interface elements to sort the set members of the "car manufacturers" included in column D.

Included proximate to the display of pop-up window 202 is pop-out window 204, which provides additional operations executable for filtering set members included in column D of user interface 200. Specifically, pop-out window 204 comprises selectable user interface elements for filtering set members and/or rows including unique combinations of set members included in cells of column D, unique combinations of set members included in cells of column D that also include one or more specified set member, and unique combinations of set members included in cells of column D that exclude one or more specified set members.

Figure 3:
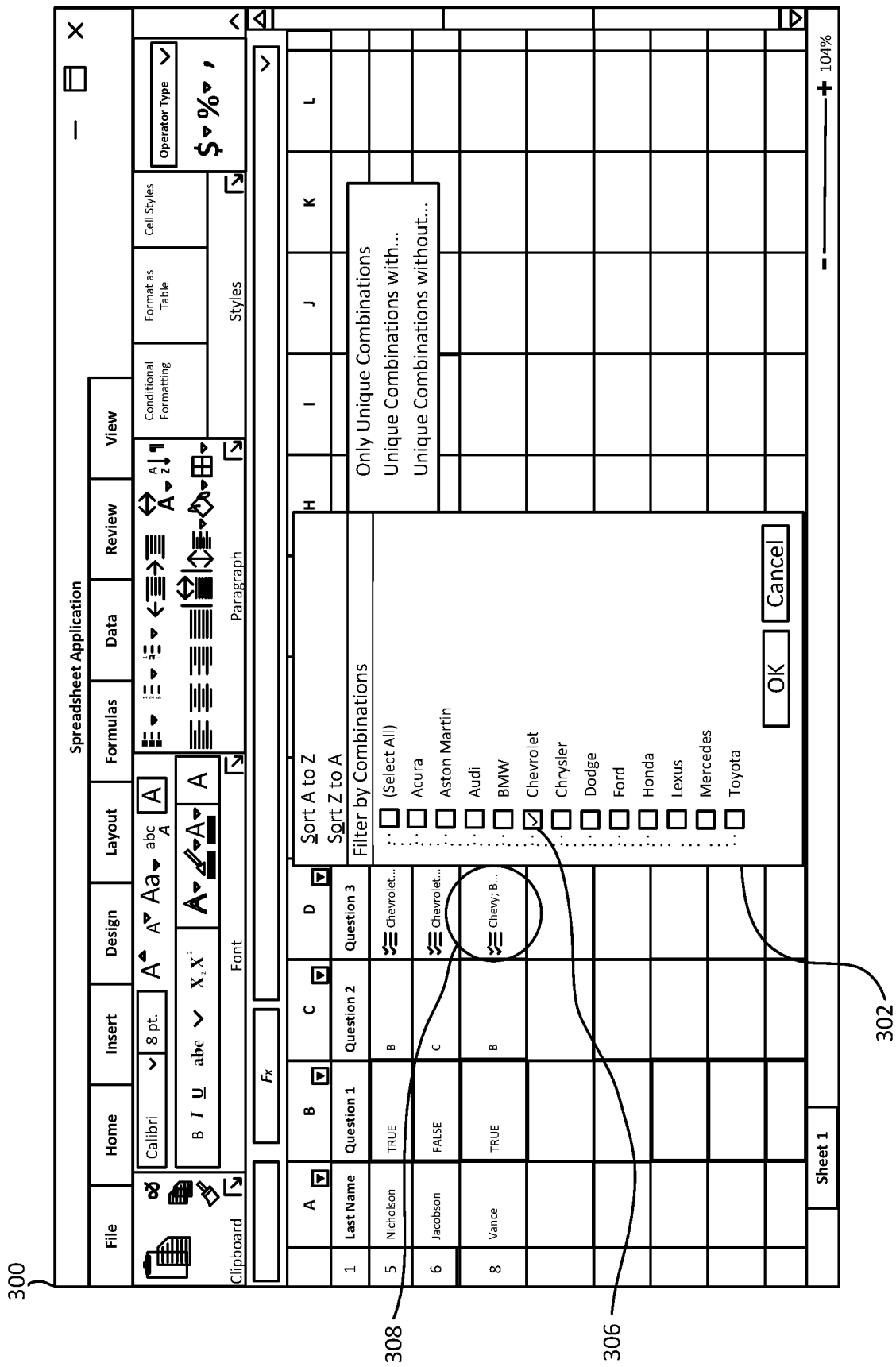
FIG. 3 illustrates a display result, in a spreadsheet application user interface, of an executed filtering operation for a set, which has been executed as a result of a received indication to filter members of the set according to a particular member of the set.

FIG. 3 illustrates a display result, in a spreadsheet application user interface 300, of an executed filtering operation for a set, which has been executed as a result of a received indication to filter members of the set according to a particular member of the set. Specifically, a user has selected "Chevrolet" filtering user interface element 306 in pop-up window 302. Selecting "Chevrolet" and confirming that selection via the "OK" button in pop-up window 302 has caused a computing device executing the spreadsheet application instance displayed in spreadsheet application user interface 300 to apply a set subtraction calculation on the "car manufacturer" set that subtracts every set member of the set included in column D, except for set member "Chevrolet". The result of that set calculation is then applied to each row that does not contain set member "Chevrolet" in column D, removing those rows from the display of spreadsheet application user interface 300. In this example, rows five, six, and eight remain as the result of the filtering operation. With regard to row 8, cell D8 contains a synonym of "Chevrolet" (i.e., "Chevy" 308), which has been identified in a set index containing information associated with the "car manufacturer" set. As such, the "Chevy" value 308 was converted to the corresponding "Chevrolet" set member, and set operations can therefore be applied to that set member.

Figure 4B:
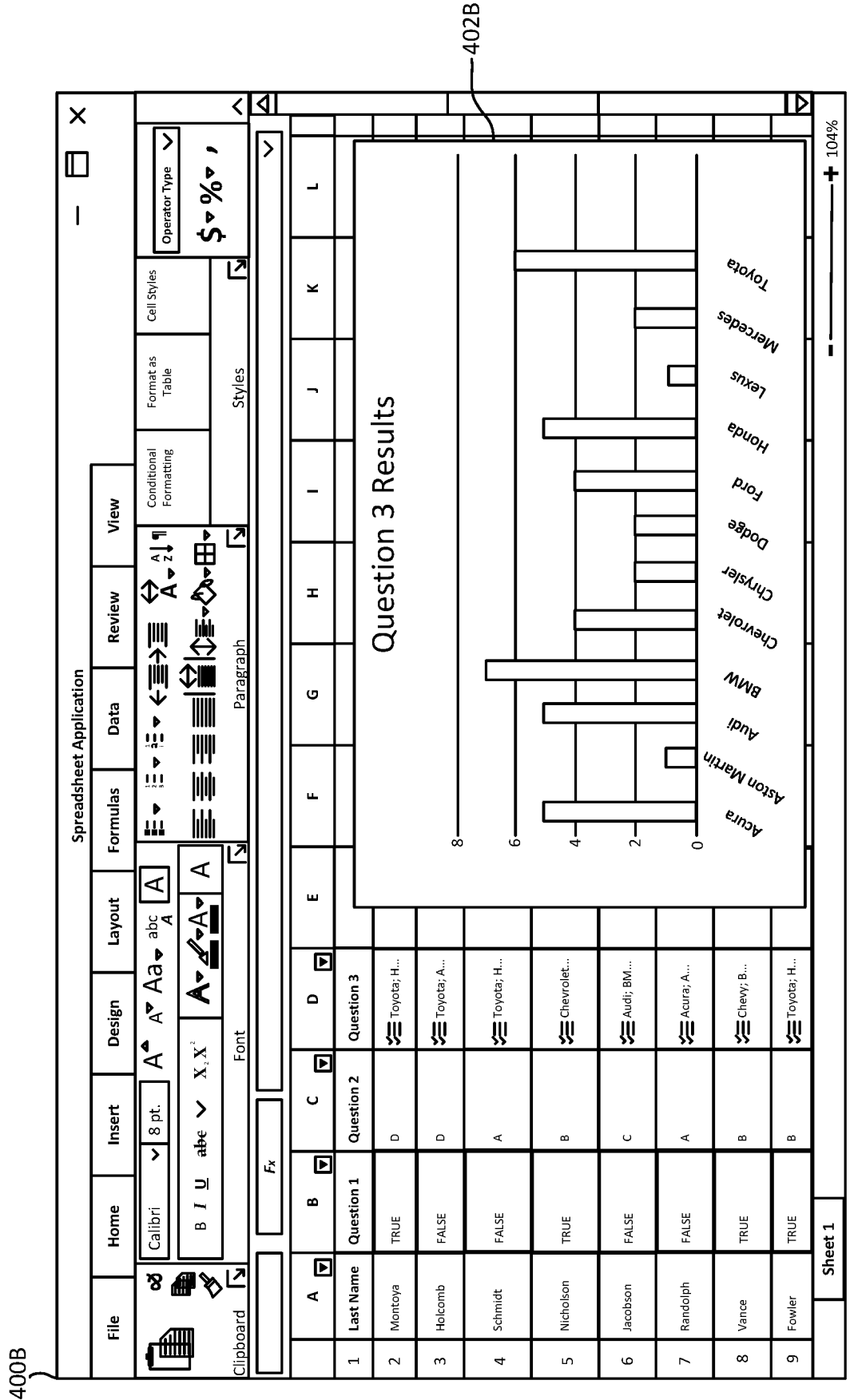
FIG. 4B illustrates a display result, in a spreadsheet application user interface, of an executed chart insertion operation associated with a set, which has been executed as a result of a received indication to insert a chart associated with members of a set.

FIG. 4A illustrates an exemplary spreadsheet application user interface 400A that includes a pop-up window 404A for receiving an indication to insert a chart or table corresponding to one or more operations that may be performed in association with values of a set. The set included in this example is the same "car manufacturer" set depicted in each of FIGS. 1-3 and FIG. 4B. The "car manufacturer" set members included in the illustrated spreadsheet application instance are shown in column D A user may choose to perform one or more set operations on the set, and upon performing the one or more set operations, cause pop-up window 404A to be displayed via selection of user interface element 402A, and subsequently execute an insert chart operation via selection of insert chart user interface element 406A in pop-up window 404A. In this manner, a user may quickly and efficiently generate charts for set data reflecting only particular data associated with a set that they may wish to view.

A user may filter or sort set members included in a spreadsheet application by one or more properties associated with members of a set, and have a graph that reflects the result of the applied operation generated and displayed via spreadsheet application user interface 400A. Although basic sort and filter operations may be applied (and a chart subsequently generated) to a given set based on the name/identity of set members, other filtering and sorting operations may be applied based on any number of properties that may be associated with set members. For example, for the illustrated "car manufacturer" set, each set member may have a property associated with it designating vehicle types that each "car manufacturer" set member produces, as well as a sales figure associated with sales of each vehicle type. In that case, the "car manufacturer" set members could be filtered by the spreadsheet application instance by one or more of those properties (e.g., filter based on set members that have a property indicating they produce trucks and/or set members that have a property indicating that they had 2017 sales greater than 500,000,000.00 for SUVs).

Likewise, other more specific examples accomplishable via the implementation of the set-based infrastructure described herein include features that a productivity application supports that may incorporate functionality supported by set members and/or properties associated with set members, including: the displaying of unique combinations associated with set members in association with pivot tables, and the displaying of the result of set-based operations for combinations of set values that contain one or more variable set members.

In this manner, large sets can be easily interacted with via operations applied to set members based on any number of custom properties associated with set members, and graphs reflecting the results of those operations can be quickly and efficiently generated. The ability to perform these types of set operations on set data types, and have the results of those operations visually displayed to users (e.g., via re-arrangement of data in a spreadsheet, via the generation of graphs reflecting various applied operations) makes interacting with large data sets much more user friendly, reduces the amount of application navigation and scrolling to identify relevant information, reduces the number of user commands necessary to identify relevant information, saves on user time necessary to identify relevant information and produce demonstrative visuals of that information, therefore also saving on the number processing cycles of an executing computing device.

FIG. 4B illustrates a display result, in a spreadsheet application user interface 400B, of the executed chart insertion operation discussed in relation to FIG. 4A, which has been executed as a result of a received indication to insert a chart 402B associated with members of a set. In this example, a user executed a count function, to count the number of set members in column D belonging to the "car manufacturers" set, and have a chart reflecting the result of that function generated and displayed in spreadsheet application user interface 400B. In this example, the chart 402B illustrates that, in response to question three of the survey that corresponds to the data included in the spreadsheet application instance, set member "Acura" was selected by five survey takers, set member Aston Martin was selected by one survey takers, set member Audi was selected by five survey takers, set member BMW was selected by seven survey takers, set member Chevrolet was selected by four survey takers, set member Chrysler was selected by two survey takers, set member Dodge was selected by two survey takers, set member Ford was selected by four survey takers, set member Honda was selected by five survey takers, set member Lexus was selected by one survey taker, set member Mercedes was selected by two survey takers, and set member Toyota was selected by six survey takers.

Although the chart 402B visually reflects the results of one type of function (i.e., a count function), one or more other types of functions may be applied to set members, and the results of those one or more functions may be caused to be visually displayed via the generation of a chart. For example, one or more of the following functions/operations may be applied to set data, and a graph reflecting the results of those functions/operations subsequently generated and displayed: A-Z sorting, Z-A sorting, custom ordering defined by lists, natural sorting of set data, count of items in sets and subsets, count of unique items within sets and subsets, count of a specific item in sets and subsets, count of items not in a set or subset, add functions, subtract functions, multiply functions, divide functions, union functions, complement functions, power functions, symmetric difference functions, and helper functions, among others.

Additionally, various chart types may be selected from in which to visually display the results of the application of one or more functions applied to set data. For example, users may be provided with an option to create bar charts, histograms, column charts, line charts, pie charts, doughnut charts, area charts, scatter charts, bubble charts, stock charts, surface charts, radar charts, and combo charts, among others, for visually displaying the result of one or more functions and/or operations applied to set data.

Figure 5:
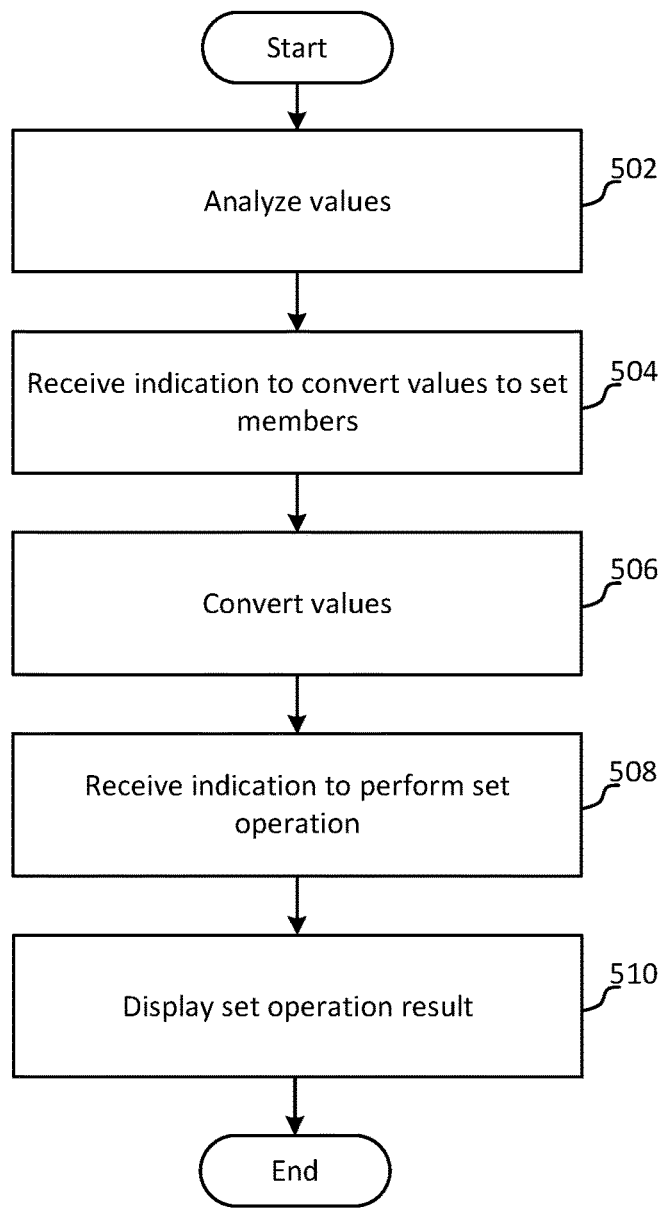
FIG. 5 is an exemplary method for interacting with set data in a productivity application.

FIG. 5 is an exemplary method 500 for interacting with set data in a productivity application. The method 500 begins at a start operation and flow continues to operation 502, where a plurality of values included in a productivity application are analyzed to determine whether one or more of those values should be converted to a member of a set. In some examples, the analyzed values may be comprised in columns and rows (i.e., cells) of a productivity application. In other examples, the analyzed values may be comprised in, or associated with, charts, graphs, or other productivity application objects. For example, a chart included in a productivity application may reflect the manipulation of one or more values, via one or more functions, of a table of values stored in the same sheet of the productivity application, a different sheet of the productivity application, a different application, a remote service, and/or a website, and those values, regardless of their location, may be analyzed at operation 502. In some examples, the values that are analyzed at operation 502 may be analyzed after one or functions and/or operations have been applied to them.

In some examples, analysis of the one or more values may comprise identifying strings of a plurality of values. The identification of strings may comprise identifying delimiters that separate one or more analyzed values. In some examples, the analysis of the one or more values may comprise identifying repeat values in a productivity application. In additional examples, the analysis of the one or more values may comprise determining whether each analyzed values matches the identity of an existing set member and/or a synonym of an existing set member. In other examples, the analysis of one or more values may comprise machine learning to determine a likelihood that each analyzed value may correspond to an existing set and/or whether a user is likely to want to create a new set based on one or more analyzed values.

From operation 502 flow continues to operation 504, where an indication is received to convert one or more of the analyzed values to set members. In some examples, the indication may comprise the result an analysis operation described above with respect to operation 502. In other examples, the indication may comprise the result of a plurality of analysis operations described above with respect to operation 502. For example, a score may be generated for one or more analyzed values, for each analysis operation, and an indication to convert one or more analyzed values may be received if a score for one or more analysis operations applied to one or more values reaches a score threshold. In still other examples, each analysis operation may be weighted, and an indication to convert one or more analyzed values may be received if a weighted score for a plurality of analysis operations applied to one or more values reaches a weighted score threshold. In still other examples, an indication to convert one or more values to set members may comprise a user command to convert one or more values to weighted score values.

From operation 504 flow continues to operation 506, where one or more values for which an indication has been received at operation 504 to convert those values to set members, are converted to set members. In some examples, the conversion of one or more values to set members may comprise adding the one or more values to an existing set. In other examples, the conversion of one or more values to set members may comprise adding the one or more values to a new set. In some examples, upon converting one or more values to set members, a user may be able to define properties associated with each value in association with the set. In other examples, upon converting one or more values to set members, one or more properties may be automatically associated with each value based on an existing set that the one or more members are being associated with. In additional examples, upon converting one or more value to set members, the display of those values in the productivity application may be modified. In some examples, the display modification may comprise reordering of the one or more values in their display based on one or more set properties. In other examples, the display modification may comprise displaying one or more converted values in association with one or more set members of a set that the one or more converted values have been converted to. According to additional examples, one or more set operations may become executable on the one or more converted values upon their conversion to set members.

From operation 506 flow continues to operation 508, where an indication to perform a set operation associated with members of a set to which the one or more converted values have been converted to. The indication may comprise a user command received via a user interface element of the productivity application, a spoken command, a tactile command received via a display of a computing device executing and/or displaying the productivity application, and/or a command received via an input device to the computing device executing and/or displaying the productivity application. Upon receiving the indication to perform the set operation, the set operation may be performed by a computing device executing the productivity application.

From operation 508 flow continues to operation 510, where a result of the executed set operation is caused to be displayed on the productivity application user interface. For example, if a performed set operation comprises a sort operation performed on a plurality of set members, the plurality of set members may be caused to displayed on the productivity application user interface in a sort order corresponding to the performed operation. In another example, if a performed set operation comprises a filter operation performed on a plurality of set members, the filtered result of filtered set members may be caused to be displayed on the productivity application user interface. In additional examples, if a performed set operation comprises an insert chart operation reflecting the results of one or more functions and/or operations applied to one or more set members, a chart reflecting the results of the one or more functions and/or operations as applied to the one or more set members may be caused to be displayed on the productivity application user interface.

From operation 510 flow continues to an end operation, and the method 500 ends.

Figure 6:
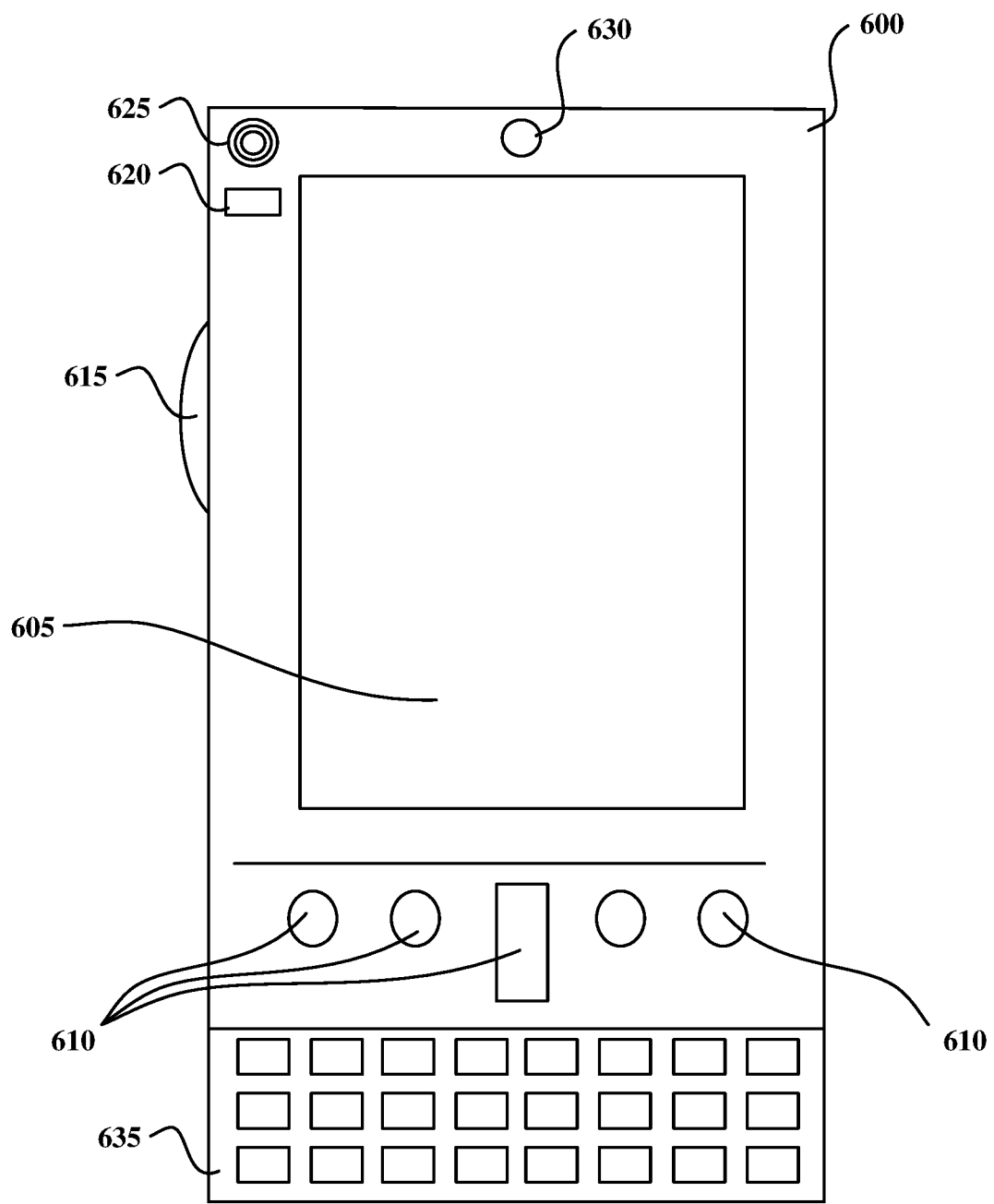
FIGS. 6 and 7 are simplified diagrams of a mobile computing device with which aspects of the disclosure may be practiced.
Figure 7:
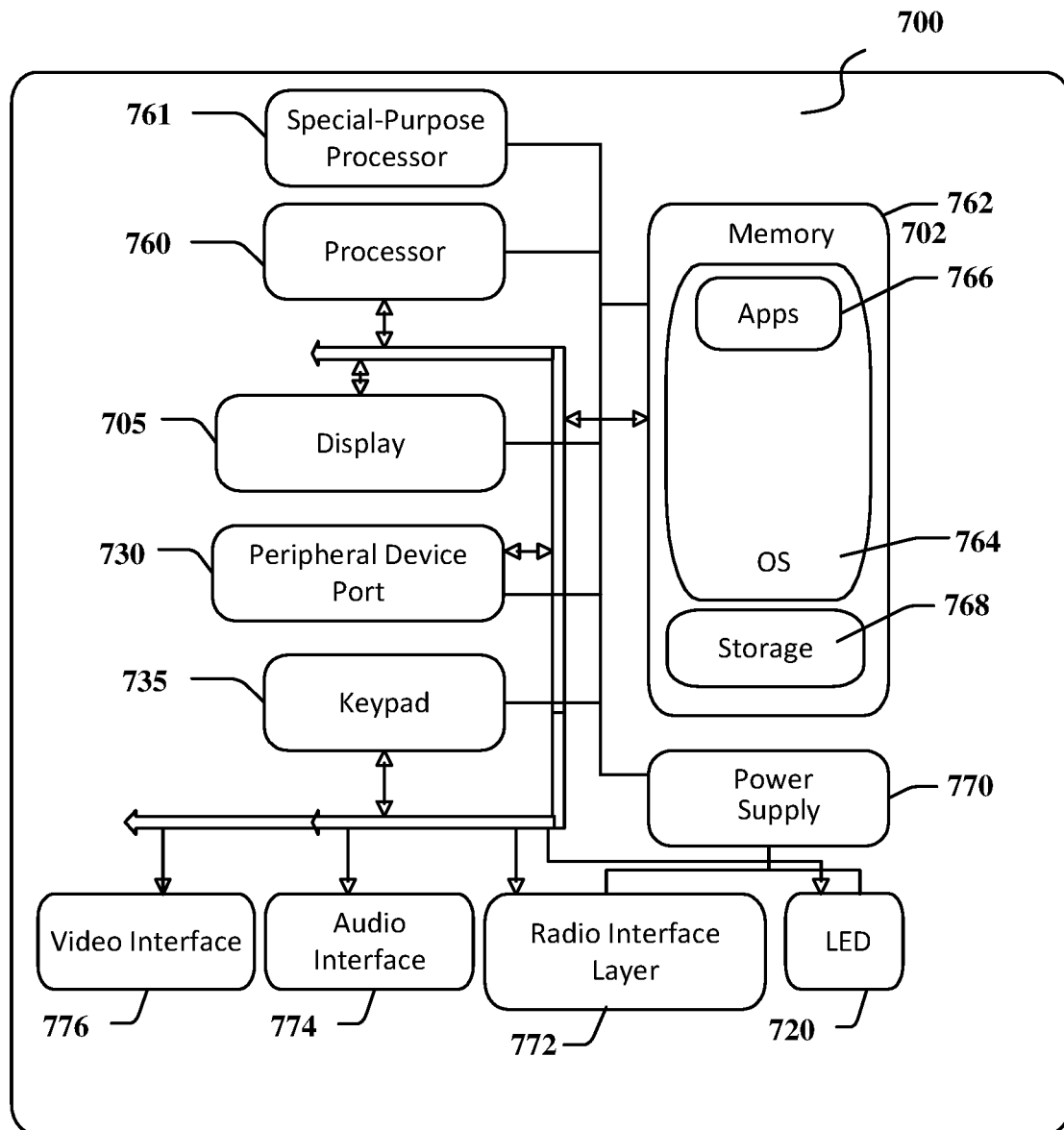

FIGS. 6 and 7 illustrate a mobile computing device 600, for example, a mobile telephone, a smart phone, wearable computer, a tablet computer, an e-reader, a laptop computer, and an augmented reality computer, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for identifying a target value in a data set.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
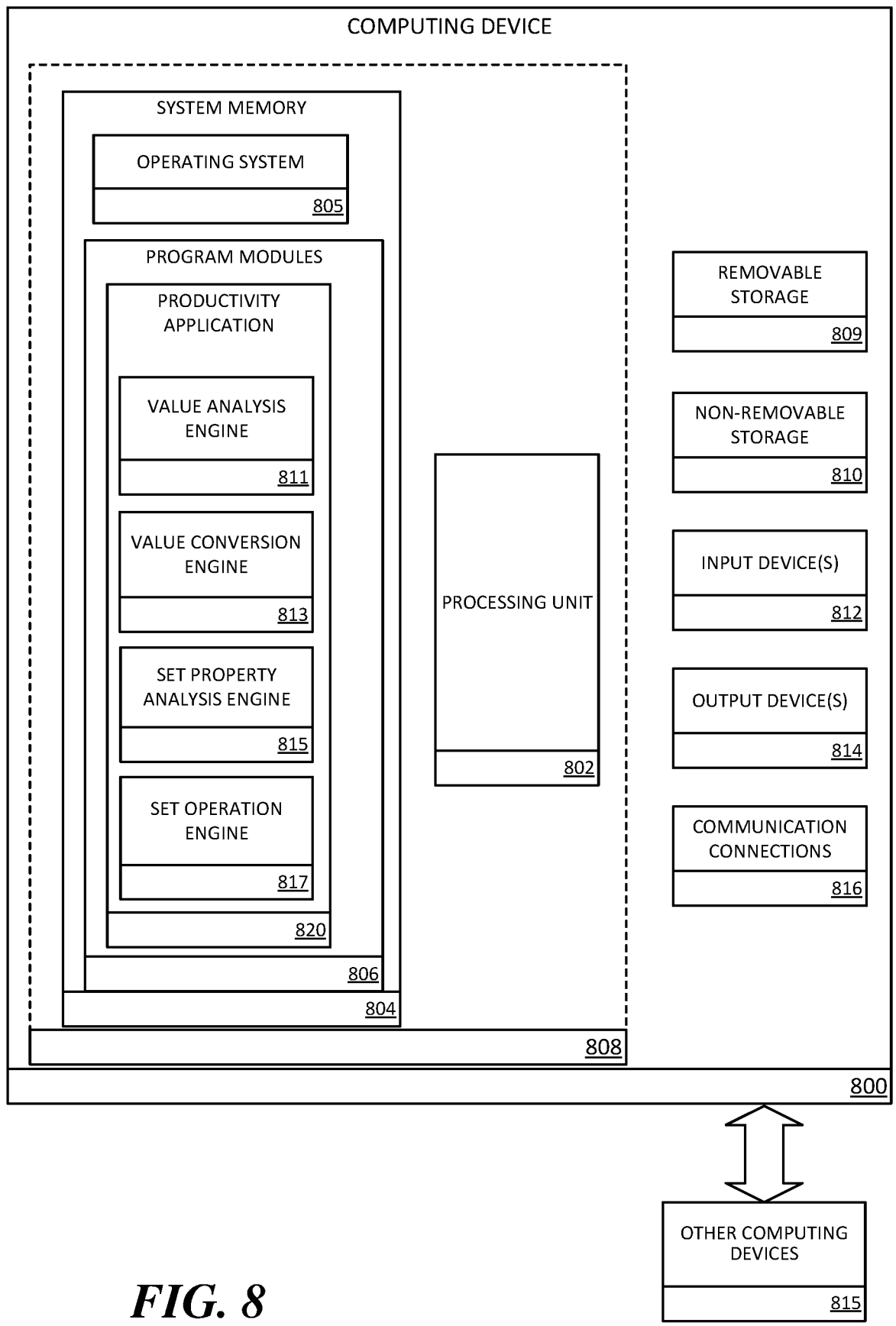
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with interacting with data in a productivity application. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more productivity application programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., productivity application 820) may perform processes including, but not limited to, the aspects, as described herein. According to examples, the value analysis engine 811 may perform one or more operations associated with analyzing a plurality of values associated with the productivity application 820, and determining based on that analysis, whether to convert one or more analyzed values to members of a set. Value conversion engine 813 may perform one or more operations associated with converting one or more analyzed values to members of a set. Set property analysis engine 815 may perform one or more operations associated with assigning one or more properties and/or property values to one or more members of a set, and analyzing one or more properties and/or property values of one or more members of a set. Set operation engine 817 may perform one or more operations associated with executing one or more set operations on one or more members of a set.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 815. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
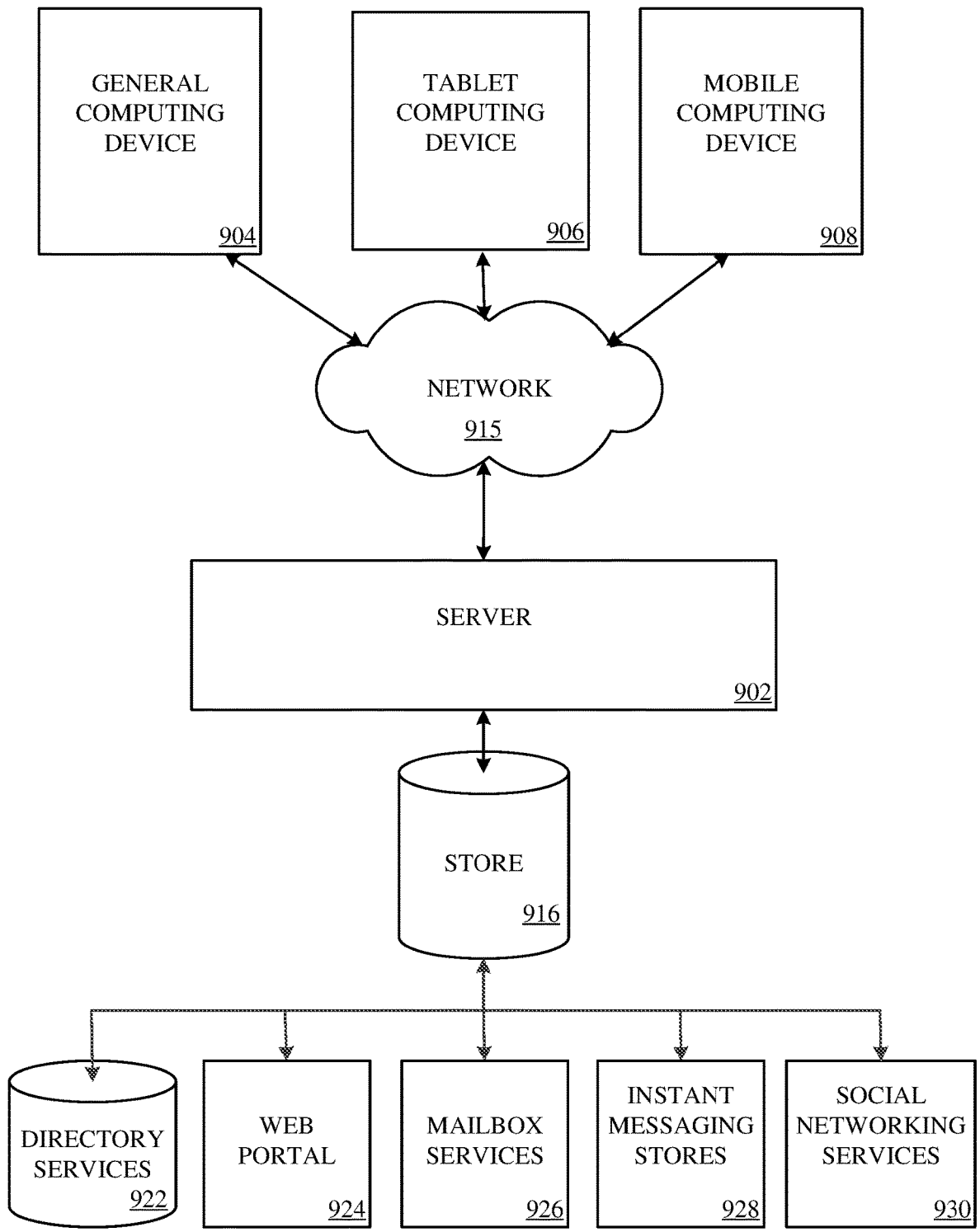
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide technical advantages for improving interaction with data associated with productivity applications. For example, the performance of useful operations, such as sort and filter operations based on set-theory calculations, which were previously incapable of being performed on unique value types, may be accomplished according to the mechanisms described herein. The ability to perform set operations associated with values converted to set members in productivity applications via the mechanisms described herein allows users to parse large amounts of data according to any number of property types that may be associated with sets and set members, and thereby quickly and efficiently identify relevant information associated with that data. These enhanced features provide a better user experience, the ability to quickly and efficiently identify unique patterns associated with values that have been converted to set members, and cost savings at least in the time required to identify relevant data in productivity applications, and the processing costs (i.e., CPU cycles) required to identify relevant data and navigate large data sets comprised in productivity applications.

As will be understood from the forgoing disclosure, one aspect of the technology relates to a method for interacting with data in a productivity application executed on a computing device, the method comprising: analyzing a plurality of values associated with the productivity application; receiving an indication to convert at least one of the analyzed values to a member of a set, the set comprising a plurality of values with a set data type upon which the productivity application can execute a plurality of set operations; converting, based on the received indication, at least one of the analyzed values to a member of the set; receiving an indication to perform a set operation associated with at least one of the converted values; and displaying, on a user interface of the computing device, a result of the set operation.

According to some examples, the productivity application is a spreadsheet application. In some examples, the analyzed values are comprised in one or more of: one or more cells comprised in the productivity application; one or more charts comprised in the productivity application; one or more tables comprised in the productivity application; an index comprised in the productivity application; an index comprised in a remote service; an application that is not the productivity application; and a website. In additional examples, the analyzing comprises one or more of: determining whether each of the plurality of values corresponds to a data type of an existing set; and determining whether each of the plurality of values is a member of a string of values comprised in the productivity application, wherein each member of a string is separated by a delimiter. In still other examples, the analyzing comprises determining whether each of the plurality of values corresponds to a synonym of a set value of an existing set. In some examples, the set operation comprises an add function applied to add a first plurality of members belonging to a first subset of the set to a second plurality of members belonging to a second subset of the set, and wherein the displayed result of the set operation comprises a display of each member of the first and second pluralities of members. In additional examples, the set operation comprises a subtract function applied to subtract a first plurality of members belonging to a first subset of the set from a second plurality of members belonging to a second subset of the set, and wherein the displayed result of the set operation comprises a display of each member of the result of the subtraction. In some examples, the set data type is associated with a plurality of operations unique to the set based on the identity of each value in the set. In still other examples, the set data type is associated with a plurality of operations unique to the set based on metadata associated with each value of the set. In additional examples, the set operation comprises a sort operation, and wherein upon performing the set operation each of the converted values is displayed on the user interface of the computing device in association with a plurality of other members of the set, and wherein each displayed member of the set is displayed in a sort order corresponding to a set property type that each member of the set shares. In yet other examples, the received indication to perform a set operation associated with at least one of the converted values comprises one of: a request to filter the set according to at least one property that differs amongst a plurality of members of the set; and a request to filter the set based on a plurality of subsets of the set that have a unique set of members.

In another aspect, the technology relates to a system for interacting with data in a spreadsheet application, the system comprising: a memory for storing executable program code; and one or more processors, functionally coupled to the memory, the one or more processors being responsive to computer-executable instructions contained in the program code and operative to: analyze a plurality of values comprised in the spreadsheet application; receive an indication to add at least one of the analyzed values as a member of a set, the set comprising a plurality of values having at least one same property type; add each value for which the received indication has been received to the set; perform a set theory operation on a plurality of members of the set; and display, on a user interface of a computing device, a result of the set theory operation.

According to some examples, the performed set theory operation comprises one of: an add operation to add one or more first members of the set to one or more second members of the set; a subtract operation to subtract one or more members of the set from one or more second members of the set; a multiply operation to multiply one or more first members of the set with one or more second members of the set; and a divide operation to divide one or more first members of the set by one or more second members of the set. In additional examples, the set that the analyzed values are added to is an existing set, and wherein the one or more processors are further responsive to the computer-executable instructions contained in the program code and operative to: identify, based on the analysis of the plurality of values, one or more of the plurality of values as being a member of a string of values in a cell of the spreadsheet application, wherein each member of the string is separated from each other member of the string by a delimiter; determine that one or more identified members of the string of values has a same data type as each member of the existing set; and add each value that is determined to have a same data type as each member of the existing set to the existing set. In still other examples, an identity of each member of the set is stored in an index accessible by the spreadsheet application, and wherein the index comprises properties associated with each member of the set upon which one or more set operations can be performed by the spreadsheet application.

In additional examples, the set theory operation comprises a sort operation, and wherein upon performing the set theory operation each of the converted values is displayed on the user interface of the computing device in association with a plurality of other members of the set, and wherein each displayed member of the set is displayed in a sort order corresponding to a set property type that each member of the set shares.

In another aspect, the technology relates to a computer-readable storage device comprising executable instructions that, when executed by one or more processors, assists with interacting with data in a spreadsheet application, the computer-readable storage device including instructions executable by the one or more processors for: analyzing a plurality of values comprised in the spreadsheet application; receiving an indication to add at least one of the analyzed values as a member of a set, the set comprising a plurality of values having at least one same property type; adding each value for which the received indication has been received to the set; performing an operation on a plurality of members of the set; and displaying, on a user interface of a computing device, a result of the operation.

In some examples, the performed operation comprises one of: an add operation to add one or more first members of the set to one or more second members of the set; a subtract operation to subtract one or more members of the set from one or more second members of the set; a multiply operation to multiply one or more first members of the set with one or more second members of the set; and a divide operation to divide one or more first members of the set by one or more second members of the set. In additional examples, the set that the analyzed values are added to is an existing set, and wherein the instructions are further executable by the one or more processors for: identifying, based on the analysis of the plurality of values, one or more of the plurality of values as being a member of a string of values in a cell of the spreadsheet application; determining that one or more identified members of the string of values has a same data type as each member of the existing set; and adding each value that is determined to have a same data type as each member of the existing set to the existing set. In additional examples, an identity of each member of the set is stored in an index accessible by the spreadsheet application, and wherein the index comprises properties associated with each member of the set upon which one or more set operations can be performed by the spreadsheet application.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
   determining that a value associated with a productivity application belongs to an existing set comprising a plurality of members, wherein each member of the existing set has a same set data type upon which the productivity application can execute a set operation;
   receiving an indication to convert the value into a member of the existing set;
   automatically converting the value into a member of the existing set;
   receiving an indication to perform a set operation associated with the value; and
   causing the set operation to be performed.

2. The computer-implemented method of claim 1, wherein converting the value into a member of the existing set comprises associating the value with a set index.

3. The computer-implemented method of claim 2, wherein the set index comprises:
   an identity of each member of the existing set; and
   a property of each member of the existing set.

4. The computer-implemented method of claim 1, wherein converting the value into a member of the existing set comprises:
   associating metadata defining a set property of the existing set with the value.

5. The computer-implemented method of claim 1, wherein determining that the value associated with the productivity application belongs to the existing set further comprises one or more of:
   determining whether the value corresponds to a data type of an existing set; and
   determining whether the value is a member of a string of values comprised in the productivity application, wherein each member of a string is separated by a delimiter.

6. The computer-implemented method of claim 1, wherein determining that the value associated with the productivity application belongs to the existing set further comprises determining whether the value corresponds to a synonym of a set value of the existing set.

7. The method of claim 1, wherein the set operation comprises an add function applied to add a first plurality of members belonging to a first subset of the existing set to a second plurality of members belonging to a second subset of the existing set.

8. The method of claim 1, wherein the set operation comprises a subtract function applied to subtract a first plurality of members belonging to a first subset of the existing set from a second plurality of members belonging to a second subset of the existing set.

9. The method of claim 1, wherein the set data type is associated with an operation that is unique to the existing set based on a property of each member in the existing set.

10. The method of claim 1, wherein the set operation comprises a sort operation, and wherein, upon performing the set operation, the converted value is displayed in association with a plurality of other members of the existing set, and wherein each displayed member of the existing set is displayed in a sort order corresponding to a set property type that each member of the existing set shares.

11. The method of claim 1, wherein the received indication to perform a set operation associated with the value comprises one of: a request to filter the existing set according to at least one property that differs amongst a plurality of members of the existing set; and a request to filter the existing set based on a plurality of subsets of the existing set that have a unique set of members.

12. A system comprising:
a memory for storing executable program code; and
a processor, functionally coupled to the memory, the processor being responsive to computer-executable instructions contained in the program code and operative to:
determine that a value in a productivity application belongs to an existing set comprising a plurality of members, wherein each member of the existing set has a same set data type upon which the productivity application execute a set operation;
receive an indication to add the value to the existing set;
automatically add the value to the existing set; and
perform a set operation on the value.

13. The system of claim 12, wherein in automatically adding the value to the existing set, the processor is further responsive to the computer-executable instructions contained in the program code and operative to:
add an identity of the value to a set index.

14. The system of claim 13, wherein the set index comprises:
an identity of each member of the existing set; and
a property of each member of the existing set upon which a set operation can be performed by the productivity application.

15. The system of claim 12, wherein in automatically adding the value to the existing set, the processor is further responsive to the computer-executable instructions contained in the program code and operative to:
associate metadata defining a set property of the existing set with the value.

16. A computer-readable storage device comprising executable instructions that, when executed by a processor, assists with interacting with data in a productivity application, the computer-readable storage device including instructions executable by the processor for:
determining that a value in the productivity application belongs to an existing set comprising a plurality of set members, wherein each set member of the existing set has a same set data type upon which the productivity application can execute a set operation;
receiving an indication to add the value to the existing set;
automatically adding the value to the existing set; and
performing a set operation on the value.

17. The computer-readable storage device of claim 16, wherein in automatically adding the value to the existing set, the instructions are further executable by the processor for:
adding an identity of the value to a set index.

18. The computer-readable storage device of claim 16, wherein the set index comprises:
an identity of each member of the existing set; and
a property of each member of the existing set upon which a set operation can be performed by the productivity application.

19. The computer-readable storage device of claim 16, wherein in automatically adding the value to the existing set, the instructions are further executable by the processor for:
associating metadata defining a set property of the existing set with the value.

20. The computer-readable storage device of claim 16, wherein in determining that the value belongs to an existing set, the instructions are further executable by the processor for:
applying a machine learning model to the value to determine a likelihood that the value corresponds to the existing set.

* * * * *